United States Patent
Meegoda et al.

(10) Patent No.: US 11,945,014 B2
(45) Date of Patent: Apr. 2, 2024

(54) COUPLED HIGH AND LOW-FREQUENCY ULTRASOUND SYSTEMS AND METHODS FOR REMEDIATION OF CONTAMINATED SOLIDS

(71) Applicant: New Jersey Institute of Technology, Newark, NJ (US)

(72) Inventors: Jay Meegoda, Orange, NJ (US); Jitendra Kewalramani, Iselin, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 466 days.

(21) Appl. No.: 17/154,872

(22) Filed: Jan. 21, 2021

(65) Prior Publication Data

US 2021/0229106 A1 Jul. 29, 2021

Related U.S. Application Data

(60) Provisional application No. 62/965,346, filed on Jan. 24, 2020.

(51) Int. Cl.
*B09C 1/06* (2006.01)
*B09C 1/08* (2006.01)
*B06B 1/06* (2006.01)
*B06B 3/00* (2006.01)

(52) U.S. Cl.
CPC .............. *B09C 1/06* (2013.01); *B09C 1/08* (2013.01); *B06B 1/06* (2013.01); *B06B 3/00* (2013.01)

(58) Field of Classification Search
CPC .... B09C 1/06; B09C 1/08; B06B 1/06; B06B 3/00
See application file for complete search history.

(56) References Cited

U.S. PATENT DOCUMENTS

| 4,076,617 | A | * | 2/1978 | Bybel | C02F 1/36 |
| | | | | | 261/81 |
| 5,597,265 | A | * | 1/1997 | Gallo | B09C 1/10 |
| | | | | | 210/170.07 |
| 5,611,993 | A | * | 3/1997 | Babaev | A61L 2/025 |
| | | | | | 210/748.03 |

(Continued)

FOREIGN PATENT DOCUMENTS

| AU | 2001293471 B2 * | 5/2005 | A62D 3/13 |
| CA | 3000249 A1 * | 10/2019 | B08B 17/02 |

(Continued)

OTHER PUBLICATIONS

Machine Translations of CN101935087A (Year: 2011).*

(Continued)

*Primary Examiner* — Sharidan Carrillo
(74) *Attorney, Agent, or Firm* — McCarter & English, LLP

(57) ABSTRACT

Systems and methods to remediate, degrade, and/or remove pollutants within various contaminated environmental solid media that includes contaminated soils and sediments, biosolids and slurries by subjecting a mixture of the contaminated solids and a liquid to acoustic cavitation generated by more than one type of ultrasonic device. One of the ultrasonic devices operates at a low frequency and the other ultrasonic device operates at a high frequency. The system advantageously provide an efficient, sustainable, and easy to handle approach to degrade contaminant, requiring only electrical energy.

9 Claims, 10 Drawing Sheets

(56) References Cited

U.S. PATENT DOCUMENTS

| | | | |
|---|---|---|---|
| 6,019,852 | A | 2/2000 | Pedziwiatr et al. |
| 8,951,354 | B2* | 2/2015 | Sinha ................. B08B 3/12 |
| | | | 134/1.3 |
| 2004/0026334 | A1* | 2/2004 | Soll ................. C12M 45/02 |
| | | | 210/764 |
| 2007/0283985 | A1 | 12/2007 | Goodson |
| 2008/0076954 | A1 | 3/2008 | Suri et al. |
| 2010/0096337 | A1 | 4/2010 | Mader et al. |
| 2019/0226315 | A1 | 7/2019 | Laramay et al. |

FOREIGN PATENT DOCUMENTS

| | | |
|---|---|---|
| WO | WO 97/28294 | 8/1997 |
| WO | WO 03/072506 A2 | 9/2003 |
| WO | WO 2004/028717 A1 | 4/2004 |

OTHER PUBLICATIONS

Meegoda, J. N. and Perera, R., Ultrasound to Decontaminate Metals in Dredged Sediments: Journal of Hazardous Materials, vol. 85#1-2, pp. 73-89, 2001.

Meegoda J., Veerawat K, Ultrasound to Decontaminate Organics in Dredged Sediments: Soil Sediment Contamination, An Int. J. 11 pp. 91-116 2002.

US Environmental Protection Agency, In Situ Treatment Technologies for Contaminated Soil: Washington, DC, 2006 (35 pgs).

Shrestha et al., Effect of Ultrasound on Removal of Persistent Organic Pollutants (POPs) from Different Types of soils: J. Hazard. Mater. 170 pp. 871-875 2009.

US Environmental Protection Agency, Use of Amendments for In Situ Remediation at Superfund Sediment Sites: Washington DC, 2013 (60 pgs).

Interstate Technology & Regulatory Council Contaminated Sediments Team, Contaminated Sediment Remediation (CS-2): Washington, DC, 2014 (514 pgs).

Christian Pétrier, The Use of Power Ultrasound for Water Treatment. University Joseph Fourier, Grenoble, France. King Abdulaziz University, Jeddah, Saudi Arabia. 2015 (34 pgs).

Yoshiyuki Asakura, "Chapter 5—Experimental Methods in Sonochemistry," Sonochemistry and the Acoustic Bubble, pp. 119-150 (2015).

Son, Y. Advanced Oxidation Processes Using Ultrasound Technology for Water and Wastewater Treatment. In Handbook of Ultrasonics and Sonochemistry; Ashokkumar, M., Ed.; 2016.

Song et al., Evaluation Methods for Assessing Effectiveness of In Situ Remediation of Soil and Sediment Contaminated with Organic Pollutants and Heavy Metals: Environ. Int. 105, pp. 43-55, 2017.

Janitha Hewa Batagoda, et al., "In Situ Remediation of Passaic River Sediments Using Ultrasound and Ozone Nanobubbles," World Environmental and Water Resources Congress 2018, 49-63.

Gole et al., Treatment of Perfluorooctane Sulfonic Acid (PFOS) Using a Large-Scale Sonochemical Reactor, Sep. Purif. Technol, 194, pp. 104-110 2018.

Gole et al., Sono-chemical treatment of per- and poly-fluoroalkyl compounds in aqueous film-forming foams by use of a large-scale multi-transducer dual-frequency based acoustic reactor. Ultrasound. Sonochem, 45, pp. 213-222 2018.

Janitha Hewa Batagoda, et al., "Remediation of Heavy-Metal-Contaminated Sediments in USA Using Ultrasound and Ozone Nanobubbles," Journal of Environmental Engineering and Science, (2019), 14(2): 130-138.

US Environmental Protection Agency, Contaminated Site Clean-Up Information. Technology Focus. CLU-IN 2020 (available at https://clu-in.org/techfocus/), one page.

Mahinroosta, R., and Senevirathna, L., A Review of the Emerging Treatment Technologies for PFAS Contaminated Soils: J. Environ. Manage. 255 pp. 109896 2020.

U.S. Appl. No. 62/965,346, filed Jan. 4, 2020.

\* cited by examiner

Section C

Section C: Side View

COUPLED HIGH AND LOW-FREQUENCY ULTRASOUND SYSTEMS AND METHODS FOR REMEDIATION OF CONTAMINATED SOLIDS

RELATED APPLICATIONS

This application is a non-provisional application which claims priority to U.S. Provisional Application Ser. No. 62/965,346 entitled "Coupled High and Low-Frequency Ultrasound Device for Destruction of Organic Chemicals," filed on Jan. 24, 2020, the entirety of which is incorporated by reference herein.

STATEMENT REGARDING FEDERALLY SPONSORED RESEARCH

This invention was made with government support under Agreement No. 1634857 awarded by the National Science Foundation. The government has certain rights in the invention.

FIELD OF THE DISCLOSURE

The present disclosure relates to the degradation or remediation of pollutants within the contaminated solid media. In particular, the present disclosure relates to the use of ultrasound coupled with the sonochemistry processes, methods, and systems for remediation of contaminated environmental solid media, such as soils, sediments and slurries.

BACKGROUND

The stress on the abiotic solid matrix is becoming very high because of increased industrialization, which aids urbanization. It has resulted in profound and toxic effects on the ecological environment and public health. This has become a great concern and a significant liability for the nation. Hence, the preservation of the soil environment must be well driven by all engineering sectors.

Soil and sediment are a crucial natural resource-rich in nutrients and minerals vital to the health of ecosystems. Soil and sediment deposits may include clay, silt, sand, gravel, decaying organic matter, and shells. Pollutants from various sources, including current or former industrial and municipal waste discharges, agricultural sites, spills, accidents, or mining areas, often make their way to the soil and sediments, resulting in the contaminated sites. Polluted soil and sediments can contain a wide variety of contaminants, including polycyclic aromatic hydrocarbon (PAHs), polychlorinated biphenyls (PCBs), per- and polyfluoroalkyl substances (PFAS), dioxins, pesticides, heavy metals, metalloids, tributyltin (TBT), military-unique compounds such as munitions constituents, and other pollutants at concentrations that pose a known or suspected threat to the aquatic life, wildlife or human health.

Soil and sediment serve as a universal sink that bears the greatest burden of environmental pollution. Polluted soils and sediments are a significant liability for the nations. Across the U.S., there are more than 10,000 contaminated sites. Contaminated soil and sediments can act as secondary sources of pollutants to groundwater and surface water through leaching and percolation processes. Contamination can result in profound and toxic effects on agricultural plants and aquatic life and can accumulate in vegetables and organisms consumed by humans.

Remediation of the contaminated soil and sediments primarily targets the complimentary goals of protecting human health and the environment and restoring impaired environmental resources to beneficial uses. The selection of the most appropriate technology depends on the site's environmental characteristics and the ongoing fate and transport of contaminants. Solid (soils, sediments and/or sludge) remediation is challenging, expensive, and time-consuming.

The remediation of contaminated solids can be performed in-situ or ex-situ. In-situ refer to the remediation of pollutant performed in the original place, sub-surface. This strategy is aimed at the remediation of polluted soil or sediment without excavating or dredging, respectively. Ex-situ remediation is carried out by excavating or dredging contaminated soil or sediment respectively and remediating elsewhere, offsite. Comparing these two remediation strategies, in-situ remediation offers a number of potential technical, economic, and environmental advantages.

In-situ soil remediation technologies include activated carbon-based technology, air sparging, bioremediation, chemical reduction, chemical oxidation, phytotechnology, electrokinetic separation, permeable reactive barriers, soil flushing, in-situ thermal treatment, soil vapor extraction and many more. See e.g., US EPA, In Situ Treatment Technologies for Contaminated Soil: Washington, D C, 2006. WO 2004/028717 A1 and WO 97/28294 disclose a method for the in-situ electrochemical remediation and electrokinetic method for contaminated soil, respectively.

Ex-situ treatment primarily includes soil washing, thermal treatment ex-situ and solvent extraction. See e.g., US EPA Technology Focus. CLU-IN 2020 (available at https://clu-in.org/techfocus/).

Remediation approaches for polluted sediment sites can be classified into four categories, including Monitored Natural Recovery (MNR) and Enhanced Monitored Natural Recovery (EMNR); In-situ treatment; Capping; and Removal. See e.g., ITRC, Contaminated Sediment Remediation (CS-2): Washington, DC, 2014. When viable, in-situ approaches have emerged as an improvement over the remedial performance of other removal technologies. See e.g., US EPA, Use of Amendments for In Situ Remediation at Superfund Sediment Sites: Washington DC, 2013. The widely used in-situ amendment is Activated Carbon (AC). This amendment through adsorption reduces the bioavailability and mobility of various organic and metal contaminants, including PCBs, PAHs, PFAS, dimethyl dioxane, dioxins/furans, and chlorinated benzenes, tributyltin (TBT), and mercury. Although AC immobilizes the sediments' contaminants, it raises concern because the pollutants are not removed or degraded. Amendment that can degrade chemicals or transform them into less toxic forms is much more desirable. See e.g., in WO 03/72506 A2 method for in-situ remediation of sediment contaminated with PCBs, PAHs and other by treating the sediment with ozone to react the contaminants is described.

Current research on evaluation methods for assessing effectiveness of these remediation technologies is inconclusive and lacks valid and integrated evaluation methods. In general, the available solid remediation techniques possess different mechanisms and demonstrate specific benefits and drawbacks in terms of applicability, performance, cost competitiveness, duration of implementation, and site/soil disturbance. Overall, in-situ remediation techniques are more cost-competitive than ex-situ treatment methods. See. e.g., Song et. al., Evaluation Methods for Assessing Effectiveness of In Situ Remediation of Soil and Sediment Contaminated with Organic Pollutants and Heavy Metals: Environ. Int. 105 pp 43-55 2017.

PFAS are a large and complex class of anthropogenic compounds. PFAS have been detected in soils and sediments, having been transported due to atmospheric deposition, exposure to impacted media (landfill leachate or biosolids), and direct discharge. The unique physicochemical properties of PFAS render them as bio accumulative, toxic, and ubiquitous in the environment. Many existing treatment technologies (e.g., air sparging, enhanced aerobic bioremediation, etc.), except thermal incineration, have shown limited success in mineralizing PFAS, as PFAS are uniquely recalcitrant and persistent. Incineration itself is a destructive and costly method, and it is unknown whether the burning results in volatilization or complete destruction. See. e.g., Mahinroosta, R., and Senevirathna, L., A Review of the Emerging Treatment Technologies for PFAS Contaminated Soils: J. Environ. Manage. 255 pp 109896 2020. Therefore, a methodology that can degrade chemicals or transform them into less toxic forms within the soils and sediment will be a much more effective remediation method.

Ultrasonics is a branch of acoustics dealing with the generation and use of inaudible sound waves. Ultrasonics applications are rigidly classified as being either low-intensity (popularly known as non-destructive applications) or high-intensity applications (also known as power ultrasonics). Ultrasonic non-destructive testing and imaging used as means of exploration, detection, and information (e.g., the location of the crack, material properties) are some of the common low-intensity applications. High-intensity ultrasound can permanently change the physical, chemical, or biological properties or, if intense enough, even destroy the medium to which it is applied. Power ultrasonic uses include cleaning, enhancing chemical reactions, degradation of pollutants, extractions, emulsification and dispersion, food processing, ultrasonic agglomeration, welding of metals, and polymers, machining and metal forming in solids and fluids, etc.

Acoustic cavitation describes the phenomena associated with the propagation of intense sound waves in liquids generating micro-nano bubbles (MNBs). This phenomenon involves three discrete stages: nucleation, bubble growth, and, under proper conditions, implosive collapse. The dynamics of bubble collapse cause several strong sonophysical effects, such as microjet, microstreaming, mechanical rupture, friction and broadband acoustic emissions (noise and shock waves), and sonochemical reactions, including pyrolysis and radical reactions. These physical effects and/or chemical reactions form the basis for most of high-power applications.

The energy released due to bubble collapse drives the material (matter) inside the bubble to the instantaneous plasma state, achieving very high temperatures (~several thousand ° C.) and very high pressures (~several hundred bars) in a localized volume for short lifetimes (nanoseconds). These extreme conditions generated during bubble collapse provide energy for the breakage of bonds in water, and dissolved gas molecules inside the bubble, leading to the formation of different reactive species such as hydroxyl, hydrogen atoms, oxygen atoms, and hydroperoxyl radicals. Besides radical species, the formation of hydrated electrons is debated to exist at the bubble interface and possibly in the bulk solution. The application of ultrasound waves, i.e., sonolysis or sonochemical degradation or sonolytic decomposition, involves pyrolysis (thermolysis) and reactions with reactive species (mainly radicals) that break down or decompose environmental pollutants. Sonolytic process has been shown effective for the degradation of many organic chemicals in liquid water such as nitroaromatic contaminants, PCBs, PAHs, dyes, surfactants, cyanide, etc. See e.g., Son, Y. Advanced Oxidation Processes Using Ultrasound Technology for Water and Wastewater Treatment. In Handbook of Ultrasonics and Sonochemistry; Ashokkumar, M., Ed.; 2016.

The frequency of ultrasound directly affects the generation, oscillation, resonant size, and final collapse of cavitation bubbles, influencing both sonophysical and sonochemical phenomena connected with acoustic cavitation. Low-frequency ultrasound has less symmetrical bubble implosion, fewer bubble events, more violent collapse, and bigger resonant bubble size. Generally, low-frequency ultrasound has stronger sonophysical effects, e.g., polymer size-reduction is considered strong at lower frequencies but weak at higher frequencies. Ultrasonic cleaning, extractions, agglomeration are some of the common low-frequency high-intensity ultrasonic applications See. e.g., in US 2007/0283985 ultrasonic cleaning and liquid processing methods and apparatus involving two or more piezoelectric transducer is described. With an increase in frequency, the number of effective cavitation bubbles, the production of hydroxyl radicals and the diffusion of gases and volatile compounds into the bubble increases. However, the size of the collapsing bubbles and the duration of the collapse decreases. Generally, high-frequency ultrasound has strong sonochemical effects. Thus, it has been reported that the degradation rate of organic pollutants is higher in the frequency range above 200 kHz than that can be achieved with a lower frequency range.

Power ultrasound applications can be conducted using two types of equipment: probe type or bath type sonicators, operating at a fixed frequency. In an ultrasonic horn (aka probe) transducer, an ultrasonically excited metal rod with a shrinking diameter toward its end is used to produce acoustic cavitation. In this system, the amplitude of vibration is increased by attaching the specially designed metal rod, called a sonic horn, to the end of the piezoelectric transducers. This horn amplifies the acoustic energy. The complete assembly of the transducer and the horn is referred to as an ultrasonic probe or sonotrode. The intense sonication zone is directly beneath the probe, thereby transferring its ultrasonic energy to the medium directly surrounding the probe. Bubbles form and collapse in the surrounding solution, creating shear and shock waves. Probe transducers are restricted to the lower frequency range of 15 kHz to 80 kHz. See, for example, in US 2008/0076954 A1 a method for the degradation and destruction of pharmaceutical active compounds, especially estrogen hormones and antibiotics, in aqueous solutions is described, which is facilitated by ultrasonic cavitation generated by the probe transducer. However, the low-frequency probe transducers are stronger in bulk mixing and sonophysical effect, use of such transducers is ideal for desorption of contaminants, emulsification and dispersion. See, for example, Shrestha et al., Effect of Ultrasound on Removal of Persistent Organic Pollutants (POPs) from Different Types of soils: J. Hazard. Mater. 170 pp 871-875 2009, Meegoda, J. N. and Perera, R., Ultrasound to Decontaminate Metals in Dredged Sediments: Journal of Hazardous Materials, Vol. 85 #1-2, pp. 73-89, 2001, and Meegoda J., Veerawat K, Ultrasound to Decontaminate Organics in Dredged Sediments: Soil Sediment Contamination, An Int. J. 11 pp 91-116 2002. Also, most of the energy, and subsequently the cavitation, occurs in a small volume close to the surface of a probe. Therefore, the use of a 20-kHz probe requires frequent stirring to ensure homogeneity of the whole reactor.

In an ultrasonic bath, several emitting components (generally, a piezoceramic disc, also known as plate/submersible transducers) are attached outside or inner surface (along the bottom and/or walls) of a metal liquid container. In such a system, energy diffuses over a large area and the acoustic field is generally well distributed throughout the bath liquid. Such an arrangement is more appropriate for applications that do not require focused power but require diffused energy. Mostly, ultrasonic bath systems consisting of high-frequency (200 KHz and more) plate transducers are used for sonochemical degradation of environmental pollutants. See, for example, In US 2019/0226315 A1 an in situ in-line reactor for remediation of groundwater contaminant is described which is facilitated by ultrasonic cavitation generated by a high-frequency (200 KHz and higher) plate transducer. In US 2010/0096337 A1 an invention is described which relates to systems and processes for the treatment of groundwater which is facilitated by ultrasonic cavitation generated by a high-frequency (200 KHz and higher) plate transducer.

The maximum amount of displacement (amplitude of vibration) that can be generated by an ultrasonic bath transducer assembly is not very large. If too much electrical power is fed to the piezoceramic disc, energy is reflected, and the device can fail. Thus, additional stirring is needed in an ultrasonic bath system, especially having solid-liquid combinations where the solid is neither dispersed nor agitated throughout the reactor by sonication alone and simply sits at the base of the vessel where it is only partially available for reactions. Another setback using bath systems is that it develops a standing wave; thus, it may be necessary to stir the mixture mechanically to achieve the maximum effect of the ultrasonic irradiation.

In some applications, multiple plate transducers operating at different frequencies can be used in combination. See, for example, U.S. Pat. No. 6,019,852 that describes an ultrasonic cleaning method in which ultrasonic cleaning of articles is carried out in bath with rectangular grids of two different frequency transducers, separately driven by two power supplies or generators. Gole et al., Sono-chemical treatment of per- and poly-fluoroalkyl compounds in aqueous film-forming foams by use of a large-scale multi-transducer dual-frequency based acoustic reactor. Ultrasound. Sonochem, 45, pp 213-222: Sep. Purif. Technol, 194, pp 104-110 2018 describes the dual-frequency ultrasonic reactor for degradation of perfluorninated surfactants in liquids.

Both probe and bath systems employ the use of high-frequency soundwaves; however, a significant difference between the two pieces of equipment is in the way energy is transferred through the liquid media. This considerably impacts the types of applications in which they can be used effectively.

SUMMARY

Exemplary embodiments of the present disclosure are related methods and systems for remediating contaminated solids by subjecting a mixture of the contaminated solids and a liquid to acoustic cavitation generated by more than one type of ultrasonic device, such as ultrasonic transducers. The different types of ultrasonic devices can have different resonant or operating frequencies. Embodiments of the present disclosure can advantageously provide an efficient, sustainable, and easy to handle approach to degrade contaminant, requiring only electrical energy.

The different types of ultrasonic devices can deliver the energy in different ways. As an example, a low-frequency ultrasonic transducer can provide high-intensity energy to a localized region to facilitate mechanical effects on a solid-liquid system, such as agitation, to stir up the solution, uniform mixing and detaching the contaminants from the solids, and bringing them into suspension. The low-frequency ultrasonic transducer can also assist in the sonolytic degradation of pollutants. A high-frequency ultrasonic device can diffuse energy uniformly in the solid-liquid system and can induce acoustic cavitation that facilitates sonochemical degradation of the contaminants through pyrolysis and radical reaction. The low-frequency and high-frequency ultrasonic device can be combined as described herein to advantageously complement each other to facilitate efficient and effective remediation of contaminant in solids.

In accordance with embodiments of the present disclosure, systems and methods to remediate contaminants from solids is disclosed. The system includes a first type of ultrasonic device and a second type of ultrasonic device. The first type of ultrasonic device is configured to emit ultrasonic energy at a first frequency to mix a liquid with contaminated solid particles and to mechanically detach or ultrasonically desorb contaminants from the contaminated solid particles. The second type of ultrasonic device is configured to emit ultrasonic energy at a second frequency to initiate, via oxidation by free radicals and pyrolysis, sonochemical degradation of the contaminants that are detached or desorbed from contaminated solid particles, where the second frequency is greater than the first frequency.

In accordance with embodiments of the present disclosure, the second type of ultrasonic device is configured to emit the ultrasonic energy at the second frequency at an angle of ninety degrees relative to the ultrasonic energy emitted at the first frequency by the first type of ultrasonic device.

In accordance with embodiments of the present disclosure, a pair of the second type of ultrasonic device, the pair being opposingly spaced and facing each other to emit ultrasonic energy towards each other.

In accordance with embodiments of the present disclosure, the first type of ultrasonic device is energized for a first period of time and the second type of ultrasonic device is energized for a second period of time after the first type of ultrasonic device is energized for the first period of time.

In accordance with embodiments of the present disclosure, the first type of ultrasonic device and the second type of ultrasonic device are simultaneously energized.

In accordance with embodiments of the present disclosure, the second type of ultrasonic device is continuously energized, and the first type of ultrasonic device is intermittently energized at an interval of time.

In accordance with embodiments of the present disclosure, the first type of ultrasonic device and the second type of ultrasonic device are disposed in an interior volume of a chamber defined walls, where the interior volume of the chamber can receive the liquid and contaminated solid particles.

In accordance with embodiments of the present disclosure, a fluid inlet is formed in the chamber and a fluid outlet is formed in the chamber. Clean liquid can be introduced into the chamber via the fluid inlet, and wastewater can be output from the chamber via the fluid outlet. In addition, or in the alternative, a slurry, formed of the liquid and the contaminated solid particles can be introduced into the chamber via the fluid inlet, and a treated slurry can be output from the chamber via the fluid outlet.

In accordance with embodiments of the present disclosure, an ultrasonic rack can be included in the chamber, where the ultrasonic rack is moveable within the chamber. The first type of ultrasonic device can be operatively coupled to the ultrasonic rack, and baffle walls can extend from the ultrasonic rack. The second type of ultrasonic device can be operatively coupled to the baffle walls.

In accordance with embodiments of the present disclosure, the chamber can have side walls and a top wall, and can have an open bottom, where the fluid inlet and/or fluid outlet can be formed in the side walls and/or the top wall.

In accordance with embodiments of the present disclosure, the chamber can be a closed chamber enclosing the interior volume, where the fluid inlet and the fluid outlet provide access to the interior volume of chamber.

In accordance with embodiments of the present disclosure, two or more of the first type of ultrasonic device extend in a line along a length of the chamber and two or more of the second type of ultrasonic device can be disposed on side walls of the chamber along a length of the chamber.

In accordance with embodiments of the present disclosure, the first type of ultrasonic device can be a horn transducer, and the second type of ultrasonic device can be a plate transducer. The horn transducer can operate at a frequency between the range of fifteen to eighty kilohertz and/or the plate transducer can operate at a frequency greater than two hundred kilohertz.

Any combination and/or permutation of the embodiments are envisioned. Other objects and features will become apparent from the following detailed description considered in conjunction with the accompanying drawings. However, it is to be understood that the drawings are designed as an illustration only and not as a definition of the limits of the present disclosure.

BRIEF DESCRIPTION OF THE DRAWINGS

To assist those of skill in the art in making and using embodiments of the present disclosure, reference is made to the accompanying figures, wherein elements are not to scale so as to more clearly show the details, and wherein like reference numbers indicate like elements throughout the several views.

DETAILED DESCRIPTION

Disclosed herein are systems and methods for remediating contaminated solids using ultrasonic transducers. The ultrasonic transducers can be disposed in a chamber configured to receive contaminated solids to be remediated. In embodiments of the present disclosure, acoustic cavitation can be generated by different types of ultrasonic transducers, including a probe/horn transducer operating at a first frequency and one or more plate transducers operating at a second frequency that is greater than the first frequency.

Embodiments of a sonication process disclosed herein can remediate contaminated solids by acoustic cavitation, which can degrade contaminants associated with solid particles. The contaminants in the contaminated solids are generally either adsorbed into the pores of the solid particles or onto a surface of the solid particles. A mixture that includes the contaminated solid and liquid can be subjected to acoustic cavitation generated using/combining the different types of ultrasonic transducers. As one example, the horn transducer(s) can generate an intense localized ultrasound field that agitates the contaminated solids in the solid-liquid mixture, which causes the solid particles of the contaminated solids to be suspended in the liquid and can cause the solid particles to be uniformly mixed in the solid-liquid mixture. The horn transducer can operate to induce high fluid-shear stresses to facilitate ultrasonic desorption, promoting mechanical detachment of the contaminants from the solids. Ultrasonic desorption can be explained by considering the sonophysical effects of ultrasound on heterogeneous media. Acoustic cavitation generated by the horn transducers can produce high-speed microjets and high-pressure waves that impinge on the surface of the solid particles and can erode adsorbate contaminants. As the operating frequency of the ultrasonic transducer increases, the rate of the sonolytic process increases. The plate transducers can diffuse energy uniformly and induce acoustic cavitation in the solid-liquid mixture to initiate, via oxidation by free radicals and pyrolysis, sonochemical degradation of the contaminants in the solid-liquid mixture that are detached or desorbed from the solids.

As a non-limiting example, embodiments of the systems and methods described herein can remediate, degrade and/or remove organic and/or inorganic contaminants including, but not limited to one or more of persistent organic pollutants (POPs) such as PAHs, PCBs, PFAS, emerging aqueous contaminants including natural organic matter (NOMs), endocrine-disrupting compounds (EDCs), pharmaceuticals and personal care products (PPCPs), as well as other contaminants, from different environmental solid media, such as, for example, soil, sediment, and slurries.

Figure 1A:
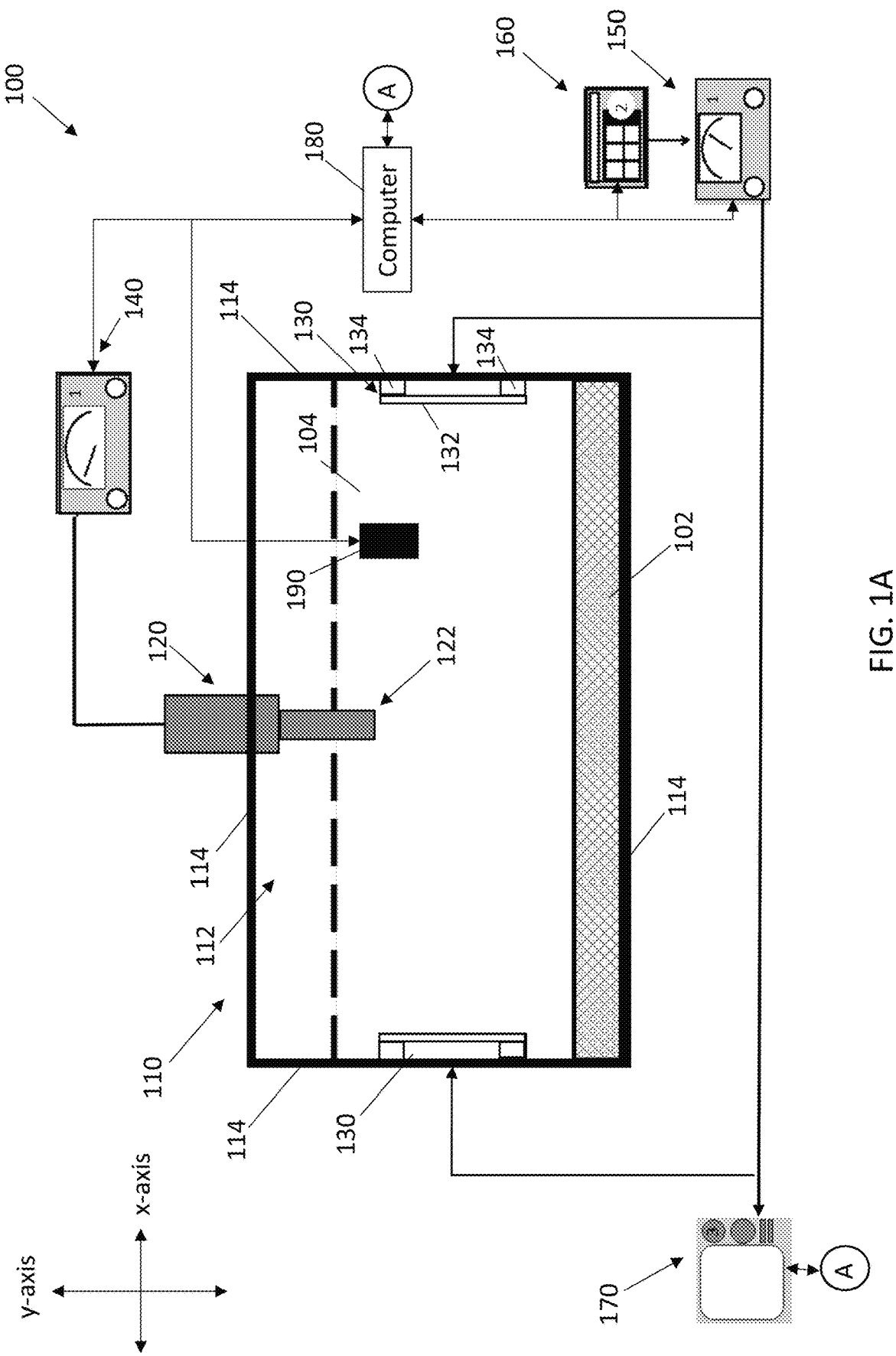
FIGS. 1A-C depict a schematic of a system for remediating contaminated solids, in accordance with embodiments of the present disclosure.
Figure 1B:
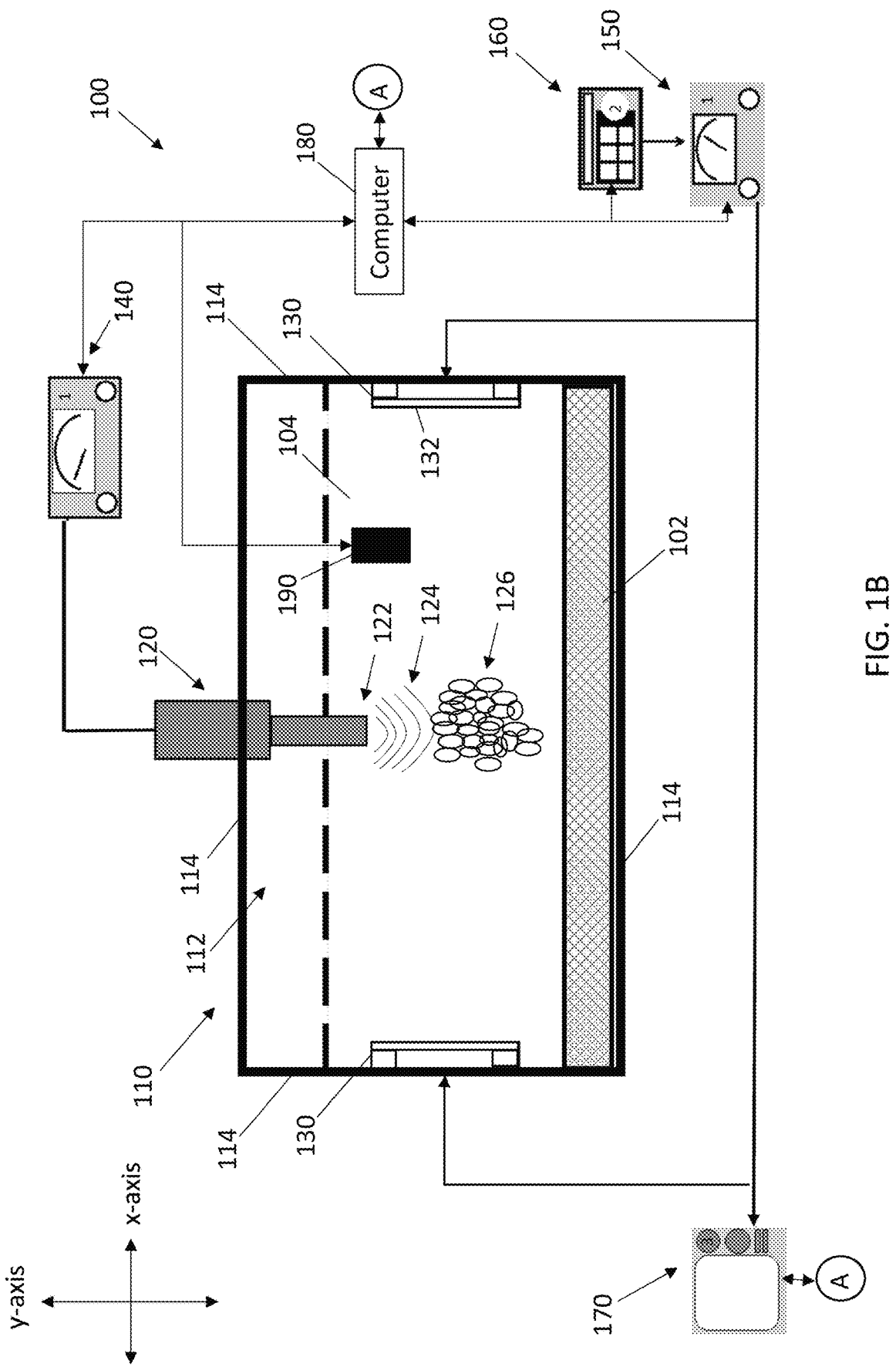
Figure 1C:
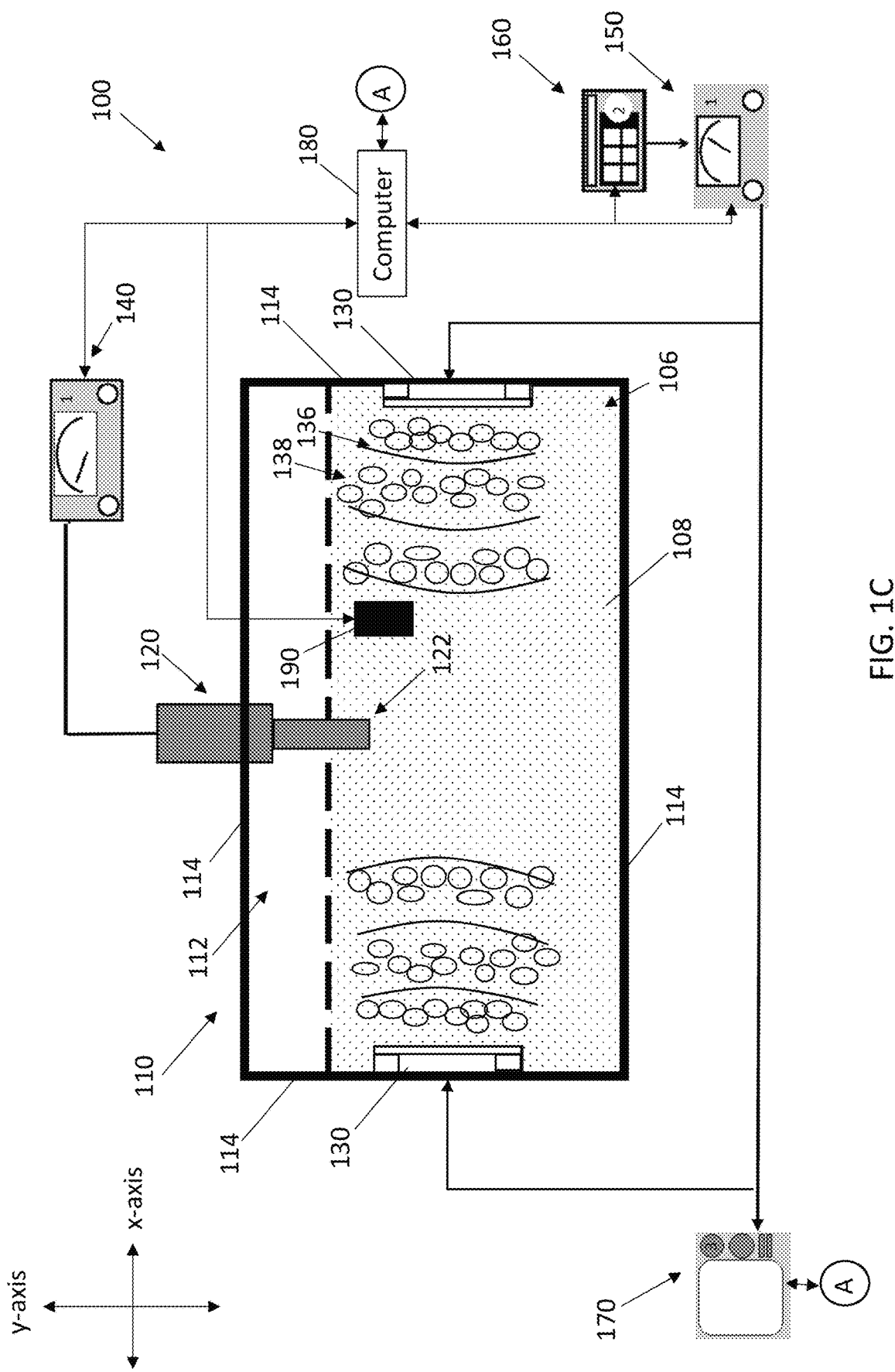

FIGS. 1A-C are schematic views of a system 100 for remediating contaminated solids in accordance with exemplary embodiments of the present disclosure. The system 100 includes a sonochemical reactor having a chamber 110 that includes an interior volume 112 defined by walls 114 for receiving contaminated solids 102 and a liquid 104 (e.g., water). The system 100 further includes a first type of ultrasonic device in the form of a horn transducer 120 and a second type of ultrasonic device in the form of one or more plate transducers 130. The ultrasonic transducers can operate to remediate, degrade, and/or remove contaminates within contaminated solids 102 submerged in the liquid 104.

The horn transducer 120 can be disposed on the chamber 110 and can extend into the interior volume 112 of the chamber 110 such that a distal end or tip 122 of the horn transducer 120 is submerged in the liquid 104. In the present example, the horn transducer 120 is disposed vertical along a y-axis on a top wall of the chamber 110 such that a distal end 122 of the horn transducers points downward. The horn transducer 120 can operate at a first frequency to emit ultrasonic waves 124 downward into the interior volume 112 generally along the y-axis. For example, the ultrasonic waves 124 can be emitted downwardly into liquid 104 from the distal end 122 of the horn transducer 120. In exemplary embodiments, the first frequency can be on the order of tens of kilohertz (e.g., approximately 15 kHz to approximately 85 kHz). In exemplary embodiments, the first frequency can be approximately twenty kilohertz (20 kHz). An acoustic amplitude of the ultrasonic waves 124 emitted by the horn transducer 120 at the first frequency can be emitted beneath the tip 122 of the horn transducer 120, and an ultrasonic energy can be transferred from the horn transducer 120 to the liquid 104 surrounding the horn transducer 120. The ultrasonic energy in the liquid from the horn transducers can result in cavitation, which causes bubbles 126 to form and collapse in the liquid 104, creating shear and shock waves that mixes the liquid 104 and the contaminated solid 102 such that solid particles 106 of the contaminated solid 102 are suspended in the liquid 104 forming a solid-liquid mixture 108. The cavitation produced by the horn transducer 120 can also operate to induce ultrasonic desorption and/or mechanical detachment of the contaminants from the solid particles 106 suspended in the solid-liquid mixture 108.

The plate transducers 130 can be positioned in the interior volume 112 along one or more walls 114 of chamber 110 and can include a vibrating plate 132 and one or more piezoceramic plates 134. In the present example, the plate transducers 130 can be oriented to be parallel to the y-axis on side walls 114 of the chamber 110 such that a planar surface 132 of each of the plate transducers 130 faces toward the interior volume 112. In one exemplary arrangement, a pair of the plate transducers 130 can be opposingly spaced from, and facing, each other. The plate transducers 130 can operate at a second frequency to emit ultrasonic waves 136 into the interior volume 112 of the chamber 110 generally along an x-axis such that the ultrasonic waves 136 emitted by the plate transducers 130 propagate at angle of approximately ninety (90) degrees relative to ultrasonic waves 124 emitted from the horn transducer 120. In some embodiments, any orientation of the horn transducers 120 and plate transducers 130 is possible. As another example, in some embodiments, one or more of the horn transducers 120 and one or more of the plate transducers 130 can face each other and emit ultrasonic energy towards each other (e.g., emit energy at 180 degree relative to each other). As another example, one or more of the horn transducers 120 and one or more of the plate transducers 130 can be parallel to each other to emit energy in the same direction (e.g., emit energy at an angle of zero degree relative to each other). In some embodiments, one or more of the horn transducers 120 and one or more of the plate transducers can be oriented to emit energy any angle relative to each other, varying from zero to 180 degrees. In exemplary embodiments, the second frequency can be greater than the first frequency. As an example, the second frequency can be on the order of hundreds of kilohertz (e.g., approximately 100 kHz to approximately 1 MHz). In exemplary embodiments, the second frequency can be approximately two hundred kilohertz (200 kHz), three hundred thirty kilohertz (330 kHz), or four hundred fifty kilohertz (450 kHz). An acoustic amplitude of the ultrasonic waves 136 emitted by the plate transducers 130 can be less than the acoustic amplitude of the horn transducer 120, and an ultrasonic energy from the plate transducers 130 can be transferred to liquid or solid-liquid mixture 108 in the interior volume 112. The ultrasonic energy in the solid-liquid mixture 108 from the plate transducers can result in cavitation, which causes bubbles 138 to form and collapse in the liquid 104. The bubbles 138 formed by the plate transducers can be generally smaller than the bubbles 126 formed by the horn transducer 120 and can be well distributed throughout the liquid-solid mixture 108. The cavitation produced by the plate transducers 130 can initiate, via oxidation by free radicals and pyrolysis, sonochemical degradation of the contaminates in the solid-liquid mixture 108 that are detached and/or desorbed from solid particles 106.

The horn transducer 120 and the plate transducers 130 can be operable coupled to power amplifiers 140 and 150, respectively. The power amplifier 140 can operate to energize the horn transducer 120 to emit the ultrasonic waves 124 and the power amplifier 150 can operate to energize the plate transducer 130 to emit the ultrasonic waves 136. A signal generator 160 can be operable coupled to the power amplifier 150 to control the output of the power amplifier 150 based on a signal output by the signal generator 160. As an example, the signal generator can output a static or constant signal and the power amplifier 150 can output a fixed voltage or current output. As another example, the signal generator 160 can output a time-varying signal (e.g., a square wave, a sine wave, a sawtooth wave, pulse width modulated signal, etc.), and the power amplifier 150 can output a voltage or current corresponding to the time-varying signal. An oscilloscope 170 can be used to monitor the output of the power amplifier 150 in response to the signal output from the signal generator 160.

In some embodiments, the power amplifier 140, power amplifier 150, signal generator 160, and/or oscilloscope 170 can be operatively coupled to a computer 180. The computer 180 can control the operation of the power amplifier 140, power amplifier 150, signal generator 160, and/or oscilloscope 170. For example, the computer 180 can be programmed to adjust parameters on the power amplifier 140, power amplifier 150, signal generator 160, and/or oscilloscope 170 to facilitate remediation of the contaminated solid 102.

In some embodiments, one or more sensors 190 can be included in the system to measure contaminants in the chamber 110. The sensor 190 can output sensed data to the computer 180, and the computer 180 can use the sensed data to monitor an operation of the system 100 to determine whether contamination of the solid has been remediated to a sufficient level and/or can use the sensed data as feedback to dynamically adjust an operation of the system (e.g., to determine whether to energize or de-energize the horn transducer and/or the plate transducer).

In an exemplary operation of an embodiment of the system 100, the horn transducer 120 and the plate transducers 130 can be controlled, via an output of the power amplifiers 140 and 150, respectively, to vibrate simultaneously. The output of the power amplifiers 140 and 150 and signal generator 160 can be controlled by the computer 180 executing a treatment application and/or can be independently controlled via their respective user interfaces. The simultaneous vibration of the horn transducer 120 and the plate transducers 130 can allow the system to continue to mix the solid-liquid mixture 108 and continue to induce ultrasonic desorption and/or mechanical detachment of the contaminants from the solid particles 106 suspended in the solid-liquid mixture 108, while simultaneously facilitating sonochemical degradation of the contaminates in the solid-liquid mixture 108 that are detached and/or desorbed from solid particles 106.

In another exemplary operation, an embodiment of the system 100 can operate in two phases. The operation phases can be controlled by the computer 180 executing a treatment application and/or can be executed by independently controlling the power amplifiers 140 and 150 and the signal generator 160. In a first phase, the horn transducer 120 is initially energized for the first period of time, such as, for example, two minutes, during which cavitation generated by the horn transducer 120 agitates the liquid 104 and contaminated solid 102 to form the solid-liquid mixture 108 and to induce ultrasonic desorption and/or mechanical detachment of the contaminants from the solid particles 106 suspended in the solid-liquid mixture 108. After the first time period, the horn transducer 120 can be de-energized and the plate transducer 130 can be energized to begin the second phase of operation of the system. In the second phase, the plate transducer 130 can be energized for the second period of time, such as, for example, ten minutes, during which cavitation generated by the plate transducer 130 facilitates sonochemical degradation of the contaminates in the solid-liquid mixture 108 that are detached and/or desorbed from solid particles 106.

In another exemplary operation of an embodiment of the system 100, the plate transducer 130 can be continuously energized by the power amplifier 150 and the horn transducer 120 can generate pulse vibrations with at a specified time interval based on an output of the power amplifier 140, such as in a system having a plate transducer 130 running continuously while horn transducer 120 can provide a burst two minutes long at every interval of ten minutes.

While an exemplary embodiment of the system for remediating contaminated solids is illustrated with respect to FIGS. 1A-C, exemplary embodiments of the system can vary. As one example, embodiments of the system for remediating contaminated solids can include different quantities of horn and plate transducers that can be disposed with respect to the chamber in different arrangement, positions, and/or orientation (e.g., the horn transducer and the plate transducers can be positioned horizontally, vertically, or at any inclination or angle). As another example, one or more of the plate transducers can operate at a different or identical frequency as the other plate transducers and/or, for embodiments that include multiple horn transducers, one or more of the horn transducers can operate at a different or identical frequency as the other horn transducers. As yet another example, in addition to, or in the alternative of, the horn transducer, exemplar embodiments can include other suitable low-frequency ultrasonic devices, such as multi-element probes, micro-tip probes, horn, Cup-Horn, Bolt-clamped Langevin Transducer (BLT), stepped plate-directional transducers, and the like. As another example, in addition to, or in the alternative of, the plate transducers, exemplary embodiments can include piezoelectric transducers or magnetostrictive transducers.

Figure 2A:
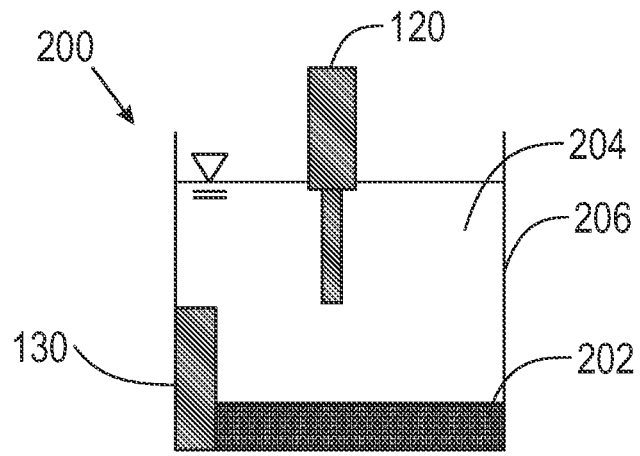
FIGS. 2A-C depict an experimental setup of a system for remediating contaminated solids, in accordance with embodiments of the present disclosure.
Figure 2B:
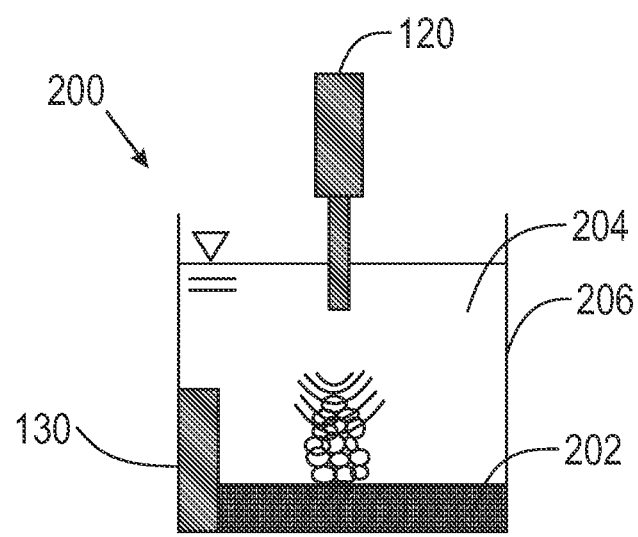
Figure 2C:
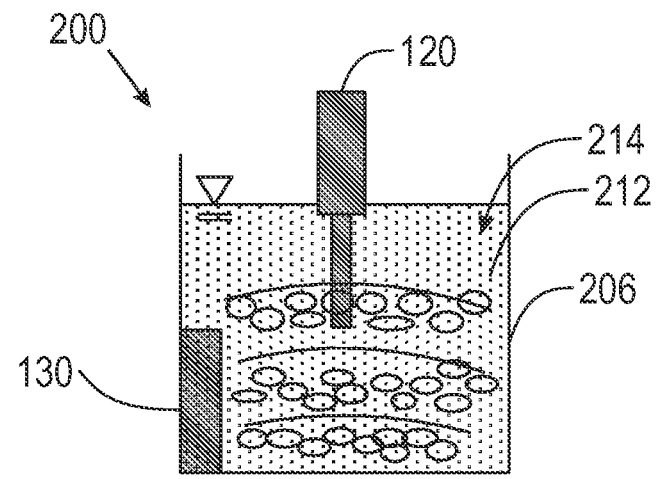

FIGS. 2A-C illustrate an experimental embodiment of a system 200 illustrating remediating of contaminated soil. The desired amount of contaminated soil 202 and distilled (DI) water 204 is taken in a glass beaker 206, as shown in FIG. 2A. The solution of contaminated soil 202 and the distilled water 204 is subjected to ultrasonic vibration for a desired number of cycles. In each cycle, vibrations are generated in two phases in this experimental embodiment. In the first phase, an embodiment of the horn transducer 120 is energized to vibrate at twenty kilohertz (20 kHz) for one minute, as shown in FIG. 2B. This first phase generates an intense localized ultrasound field 210 in the solution that agitates solids 202, brings them into suspension to form a solid-liquid solution 214 (FIG. 2C), and uniformly mixes the solid-liquid solution 214, and induce ultrasonic desorption and/or mechanical detachment of the contaminates from the solid particles 212 suspended in solid-liquid solution 214. In the second phase, an embodiment of the plate transducer 130 vibrates at a desired frequency and amplitude of power for five minutes, as shown in FIG. 2C. This second phase diffuses the energy uniformly and induces diffused acoustic cavitation in the solid-liquid solution 214. The cavitation induced by the plate transducer 130 facilitates the sono-chemical degradation of the contaminates in the solid-liquid mixture 214 that are detached and/or desorbed from solid particles via oxidation by free radicals and pyrolysis. The ultrasonic waves emitted by the plate transducers 130 can propagate at angle of approximately ninety (90) degrees relative to ultrasonic waves emitted from the horn transducer 120. In some embodiments, any orientation of the horn transducers 120 and plate transducers 130 is possible. As another example, in some embodiments, one or more of the horn transducers 120 and one or more of the plate transducers 130 can face each other and emit ultrasonic energy towards each other (e.g., emit energy at 180 degree relative to each other). As another example, one or more of the horn transducers 120 and one or more of the plate transducers 130 can be parallel to each other to emit energy in the same direction (e.g., emit energy at an angle of zero degree relative to each other). In some embodiments, one or more of the horn transducers 120 and one or more of the plate transducers can be oriented to emit energy any angle relative to each other, varying from zero to 180 degrees.

In this experimental embodiment, the feasibility of remediating contaminated soil is studied using p-terphenyl as a PAH representative. The soil 202 is highly contaminated with 1,875 mg/kg. The laboratory experiments are conducted for various conditions (concentration, power, and time duration). The glass chromatography/mass spectrometer (GC/MS) analysis of decontaminated soil is used for evaluating contaminate removal efficiency. As shown in Table 1 below, experimental results show that the high concentration of organic contaminate compounds in soils can be reduced.

TABLE 1

Preliminary results for sediment remediation.

| | Horn Transducer | | Plate Transducer | | Slurry | Soil | No. of | Total Sonication | Degradation |
|---|---|---|---|---|---|---|---|---|---|
| Test | Freq. (kHz) | Pwr (W) | Freq. (kHz) | Pwr (W) | Volume (ml) | Weight (g) | Treatment cycle | Time (min) | Efficiency (%) |
| 1 | 20 | 190 | 450 | 200 | 3000* | 80 | 12* | 120 | 65.18 |
| 2 | 20 | 190 | 330 | 170 | 800 | 80 | 12* | 120 | 70.30 |

TABLE 1-continued

Preliminary results for sediment remediation.

| Test | Horn Transducer | | Plate Transducer | | Slurry Volume (ml) | Soil Weight (g) | No. of Treatment cycle | Total Sonication Time (min) | Degradation Efficiency (%) |
|---|---|---|---|---|---|---|---|---|---|
| | Freq. (kHz) | Pwr (W) | Freq. (kHz) | Pwr (W) | | | | | |
| 3 | 20 | 190 | 330 | 110 | 800 | 40 | 20 | 120 | 82.34 |
| 4 | 20 | 190 | 330 | 90 | 800 | 80 | 40 | 240 | 86.84 |

*The geometry of reactor was different for 450 kHz transducer compared to 330 kHz transducer reactor, thus even though power level was higher for 450 kHz, the power per unit volume for 330 kHz was lower.

Figure 3A:
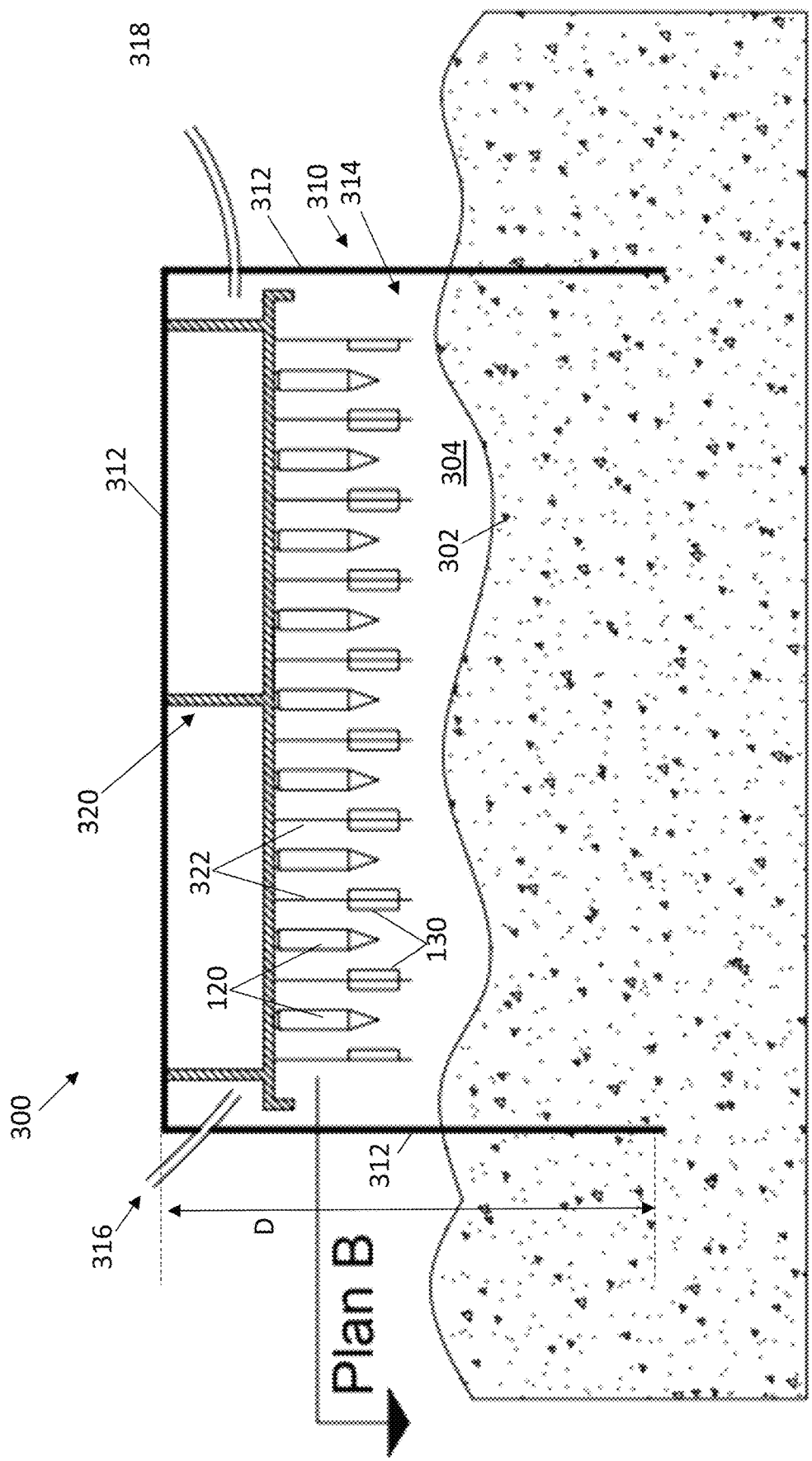
FIG. 3A depicts a schematic view of a system for remediation of contaminated sediment in a body of water in accordance with embodiments of the present disclosure.
Figure 3B:
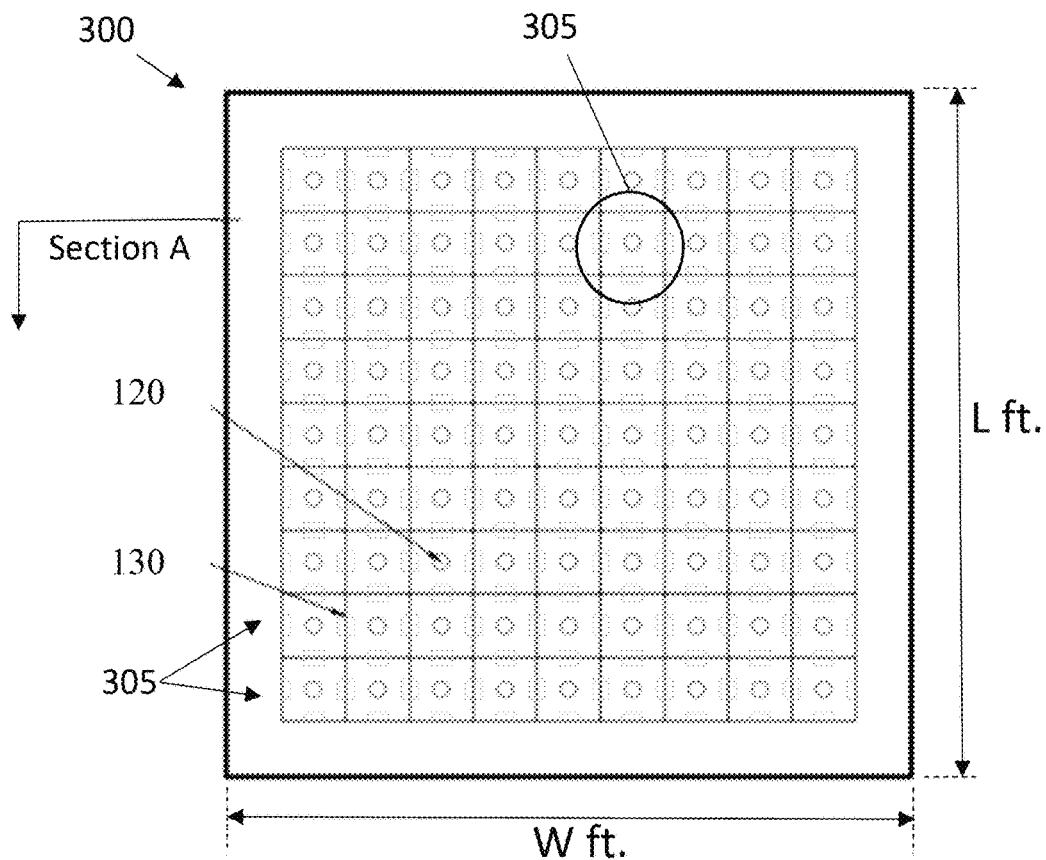
FIG. 3B depicts a top view of the system of FIG. 3A cut along the line defined as "Plan B".
Figure 3C:
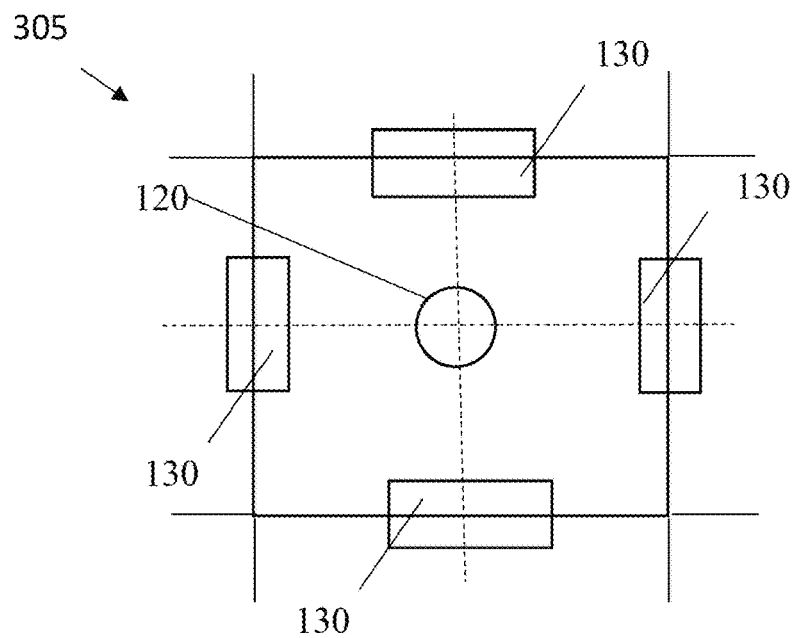
FIG. 3C depicts a detailed view of a cell in the plan view of the system shown in FIG. 3B.

FIGS. 3A-3C illustrate schematic views of a system 300 for remediation of contaminated sediment 302 at the bottom of a body of water 304 in accordance with embodiments of the present disclosure. The system 300 can include a chamber 310 having walls 312 defining an interior volume 314 and can include a fluid inlet 316 and a fluid outlet 318. A bottom of the chamber 310, is open to the interior volume. The chamber 310 can have a width of W feet, a length of L feet, and a depth of D feet. In some embodiments, the width, W, of the chamber 310 can have a range of approximately one foot to approximately twenty feet or can have a width, W, of approximately ten feet. In some embodiments, the length, L, of the chamber 310 can have a range of approximately one foot to approximately twenty feet or can have a length, L, of approximately ten feet. In some embodiments, the depth, D, of the chamber 310 can have a range of approximately one foot to approximately ten feet or can have a depth, D, of approximately five feet. In some embodiments, the chamber can be formed from stainless steel.

An ultrasound transducer rack 320 can be disposed within the chamber 310. In an example embodiment, the ultrasound transducer rack 320 can be operatively coupled to a top wall of the wall 312 of the chamber 310. The ultrasound transducer rack 320 can include baffle walls 322 extending downwardly from the ultrasound transducer rack 320 into the interior volume 314. At least one of the plate transducers 130 can be disposed on the baffle walls 322. The horn transducers 120 can extend downward from the ultrasound transducer rack 320 between the baffle walls 322. The baffle walls 322 can extend downwardly a greater distance from the ultrasound transducer rack 320 than the distal end 122 of the horn transducers 120 such that the horn transducers 120 can be recessed with respect to the baffle walls 322. In some embodiments, the distal ends 122 of the horn transducers 120 can be aligned with a midpoint of the plate transducers 130 disposed on the baffle walls 322. In some embodiments, the distal ends of the horn transducers can be above the midpoint of the plate transducers 130. In some embodiments, the horn transducers 120 can extend downwardly at different lengths and/or the plate transducers 130 can be disposed at different distances from the ultrasound transducer rack 320. In some embodiments, the system 300 can be devoid of the ultrasound transducer rack, and the baffle walls 322 and the horn transducers 120 can be affixed to the top wall of the chamber 310. In exemplary embodiments, the horn transducers 120 can operate at a first frequency and the plate transducers can operate at a second frequency. In exemplary embodiments, the first frequency can be on the order of tens of kilohertz (e.g., approximately 15 kHz to approximately 85 kHz). In exemplary embodiments, the first frequency can be approximately twenty kilohertz (20 kHz). In exemplary embodiments, the second frequency can be greater than the first frequency. As an example, the second frequency can be on the order of hundreds of kilohertz (e.g., approximately 100 kHz to approximately 1 MHz). In exemplary embodiments, the second frequency can be approximately two hundred kilohertz (200 kHz), three hundred thirty kilohertz (330 kHz), or four hundred fifty kilohertz (450 kHz). The ultrasonic waves emitted by the plate transducers 130 can propagate at angle of approximately ninety (90) degrees relative to ultrasonic waves emitted from the horn transducer 120. In some embodiments, any orientation of the horn transducers 120 and plate transducers 130 is possible. As another example, in some embodiments, one or more of the horn transducers 120 and one or more of the plate transducers 130 can face each other and emit ultrasonic energy towards each other (e.g., emit energy at 180 degree relative to each other). As another example, one or more of the horn transducers 120 and one or more of the plate transducers 130 can be parallel to each other to emit energy in the same direction (e.g., emit energy at an angle of zero degree relative to each other). In some embodiments, one or more of the horn transducers 120 and one or more of the plate transducers can be oriented to emit energy any angle relative to each other, varying from zero to 180 degrees.

In some embodiments, there are at least two baffle walls 322 in the chamber 310. In some embodiments, at least one horn transducer 120 attached to the top wall of the chamber 310 and positioned in between two baffle walls 322 to provide an intense localized ultrasound field that agitates solids, brings them into suspension, and uniformly mixes the solid-water mixture and also induces high fluid-shear stresses, which promote the mechanical detachment or ultrasonic desorption of contaminants from the sediment 302. In some embodiments, at least one plate transducer 130 is attached to the baffle wall 322 and diffuses ultrasonic energy uniformly in a solid-liquid mixture to induce acoustic cavitation and initiate sonochemical degradation of contaminates in the sediment through pyrolysis and radical reaction.

With reference to FIGS. 3B and 3C, which shows plan views of an embodiment of the system 300, the horn transducers 120 and the plate transducers 130 can be arranged in an array along the width and length of the chamber 310 as cells 305. The cells 305 can include two or more plate transducers 130 and at least one horn transducer 120. In the present embodiment, the cells 305 can include four plate transducers 130 disposed about one of the horn transducers 120 such that there is a four to one ratio of the plate transducers 130 to the probe transducers 120. The probe transducers 120 can be centered within the cells 305 relative to the plate transducers 130 of the cells 305. A size of the cells 305 and a number of the cells 305 in the system 300 can vary and/or can be determined by a size of the chamber 310.

Figure 4:
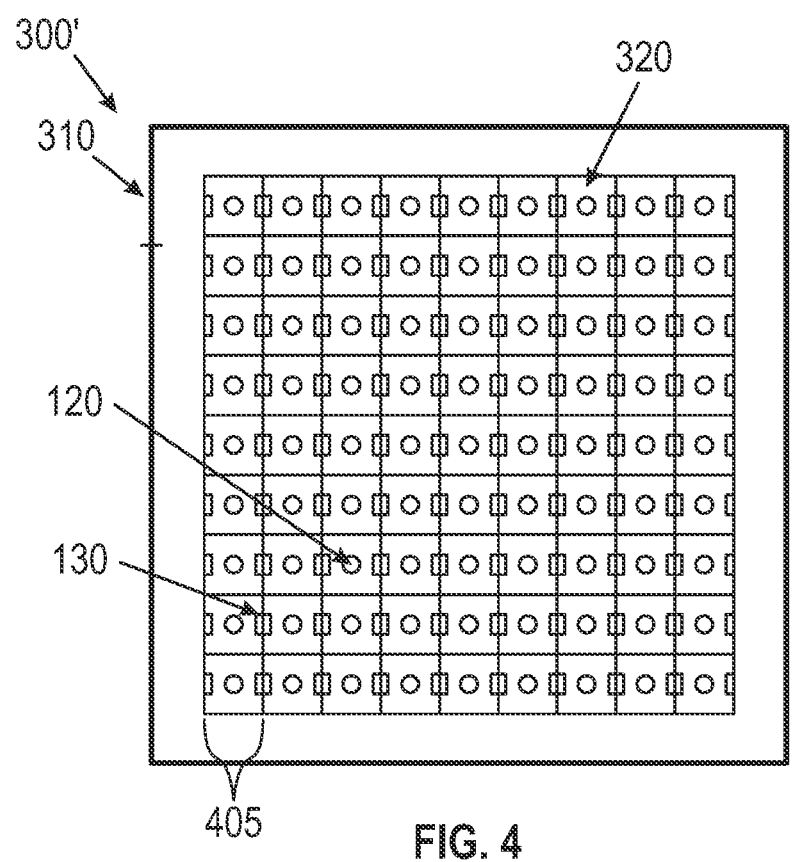
FIG. 4 depicts a schematic view of another system for remediation of contaminated sediment in a body of water in accordance with embodiments of the present disclosure.

While an exemplary embodiment of the system 300 for remediation of contaminated sediment has been illustrated as including cells 305 having one of the horn transducers 120 per four of the plate transducers 130, exemplary embodiments can include different ratios, arrangements, and/or configurations of the horn transducers and plate transducers. As an example, FIG. 4 shows a system 300' that includes the chamber 310 and support structure 320 as shown in FIG. 3A. The system 300' can include two plate transducers per one horn transducer such that there is a two to one ratio of the plate transducers 130 to the probe transducers 120. Pairs of the plate transducers 130 are opposingly spaced and facing each other, and one of the horn transducers 120 is disposed between each of the pairs of the plate transducers 130. In this configuration, cells or channels 405 are formed that include a first number of horn transducers 120 and a second number of plate transducers 130 such that there are twice as many of the plate transducers 120 as the horn transducers 130 in the cells or channels 405. The plate transducers 130 can be spaced at different intervals along the cells or channels 405.

In some embodiments, one of the plate transducers 130 can be operated at the same frequency or at multiple different frequencies. In some embodiments, one of the plate transducers 130 at one frequency (e.g., 300 kHz) and a different one of the plate transducers can operate a different frequency (e.g., 500 kHz). For example, in some embodiments two plate transducers 130 can be opposingly spaced and facing each other, and one of the two plate transducers 130 can vibrate at one frequency, and the other of the two plate transducers 130 can vibrate at a different frequency.

Figure 5:
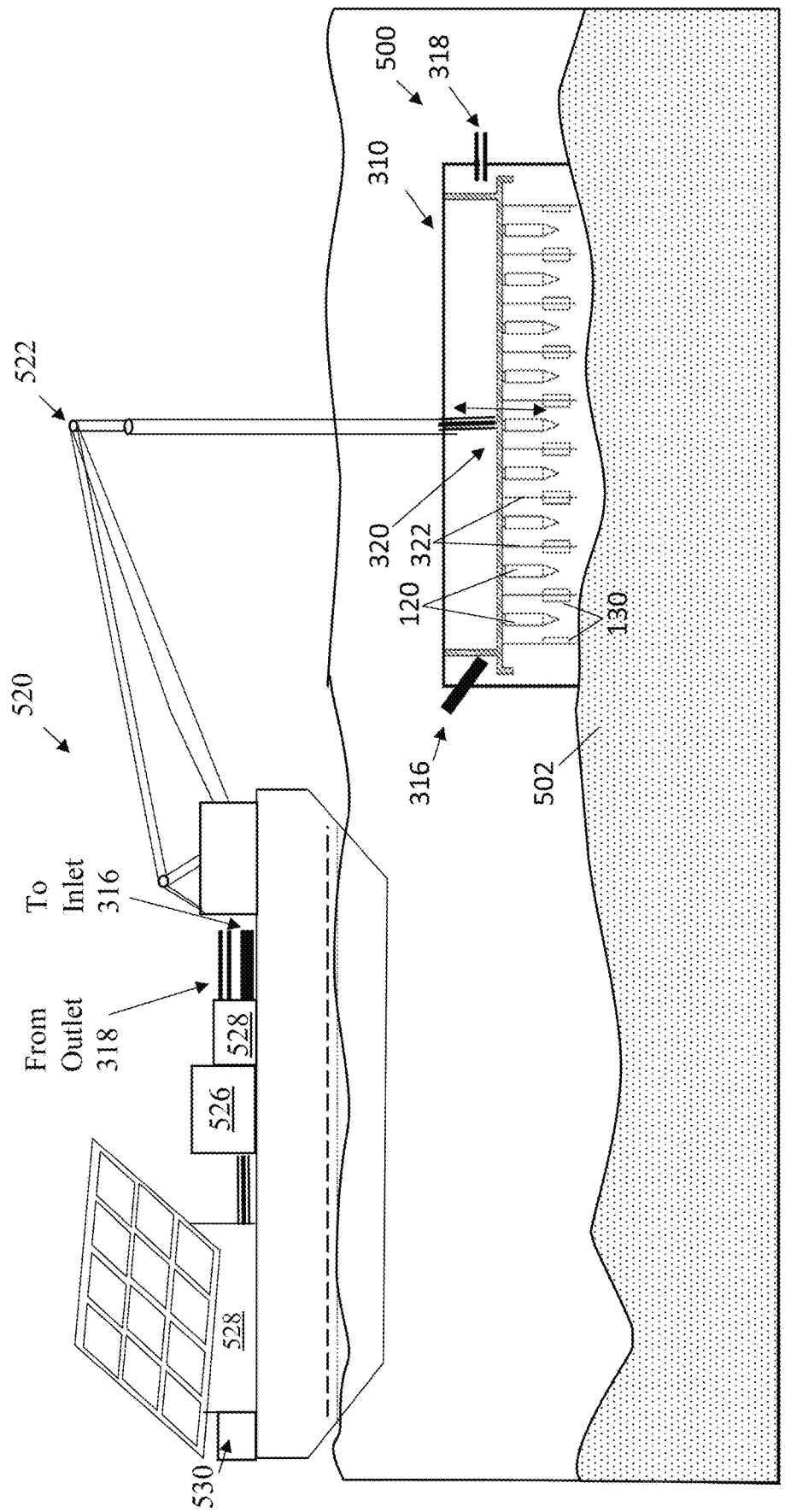
FIG. 5 depicts an application of the systems depicted in FIGS. 3A-C and 4 for remediation of contaminated sediment in accordance with embodiments of the present disclosure.

FIG. 5 illustrates an exemplary application of a system 500 for remediation of contaminated sediment in accordance with embodiments of the present disclosure. In an exemplary embodiment, the system 500 can be embodied as the system 300 or the system 300'. In the field, the system 500 can be lowered to a sediment bed 502 from a crane 522 on the barge 520. The system 500 includes the chamber 310, the fluid inlet 316, the fluid outlet 318, and the ultrasound transducer rack 320 with the plate transducers 130 attached to the baffle walls 322 and horn transducers 120 positioned between the baffle walls 322. The transducers 120 and 130 can be energized by power amplifiers as described herein with reference to FIGS. 1A-C. Chamber 310 can be lowered by the crane 522 and can be allowed to sink into sediment bed 502 due to the weight of the system 500. The fluid inlet 316 extends through the chamber 310. Once chamber 310 is set in sediment bed 502, the ultrasound transducer rack 320 can be lowered, clean water can be introduced into chamber 310, and a low-frequency ultrasound energy can be applied via the horn transducers 120 to agitate to sediment bed to mix the sediments and clean water into a solid-liquid mixture or slurry and to desorb contaminants from sediment in the sediment bed 502 as described herein. A high-frequency ultrasound energy can be applied via the plate transducers to initiate the sonochemical degradation via oxidation by free radicals and pyrolysis of the contaminates in the solid-liquid mixture that are detached and/or desorbed from solid particles. In some embodiment, the horn transducers 120 and the plate transducers 130 can vibrate simultaneously. In some embodiments, acoustic cavitation can be generated in two phases. In a first phase, the horn transducers 120 are initially operated for a first period of time, such as two minutes, and in a second phase, the plate transducers 130 are operated for a second period of time, such as ten minutes. In some embodiments, the plate transducers 130 can run continuously with the horn transducer 120 generating pulse vibrations with a specified time interval, such as in system having the plate transducers 130 running continuously while the horn transducers 120 can operate at two minutes intervals every ten minutes. The ultrasonic waves emitted by the plate transducers 130 can propagate at an angle of approximately ninety (90) degrees relative to ultrasonic waves emitted from the horn transducer 120. In some embodiments, any orientation of the horn transducers 120 and plate transducers 130 is possible. As another example, in some embodiments, one or more of the horn transducers 120 and one or more of the plate transducers 130 can face each other and emit ultrasonic energy towards each other (e.g., emit energy at 180 degree relative to each other). As another example, one or more of the horn transducers 120 and one or more of the plate transducers 130 can be parallel to each other to emit energy in the same direction (e.g., emit energy at an angle of zero degree relative to each other). In some embodiments, one or more of the horn transducers 120 and one or more of the plate transducers can be oriented to emit energy any angle relative to each other, varying from zero to 180 degrees.

After ultrasonic remediation of the sediment, the sediment is allowed to settle back into the sediment bed 502, and wastewater above the settled sediments inside the chamber 310 is extracted using one or more mechanical pumps 528 through the fluid outlet line 318 and is treated through a portable wastewater treatment facility 526 on the barge 520 or an on-site wastewater treatment facility using filtration systems, such as, for example, nano-filtration and/or precipitation to capture heavy metals and other residual chemicals before recirculating cleaned water back into the chamber 310 using the one or more mechanical pumps 528 for the continuation of the remediation of sediments. This process ensures the capture of heavy metals and other residual chemicals prior to the release of water back to the river.

In some embodiments, argon gas can be introduced into the chamber 310 of the system 500 to enhance the rate of sonolytic degradation. In some embodiments, argon can be purged into the chamber 310 from the system 500 in the form of nano-bubbles to increase the dissolution of the argon in liquid. In some embodiments, catalysts or additives such as persulfate and sulfate ions can be added to the system 500 and introduced to the chamber 310 to enhance the sonochemical reaction and cause complete mineralization of contaminants. The system 500 can employ sensors or other concentration detection devices and control subsystems or components that can be required to process the contaminated sediment at a particular rate or at a particular scale.

Once the sediment is cleaned, the chamber 310 can be lifted from the sediment bed 502 and moved to another location (e.g., an adjoining location on a grid of the sediment bed 502). The barge 520 can have a solar array 528 and backup batteries 530 to power the operation.

Figure 6A:
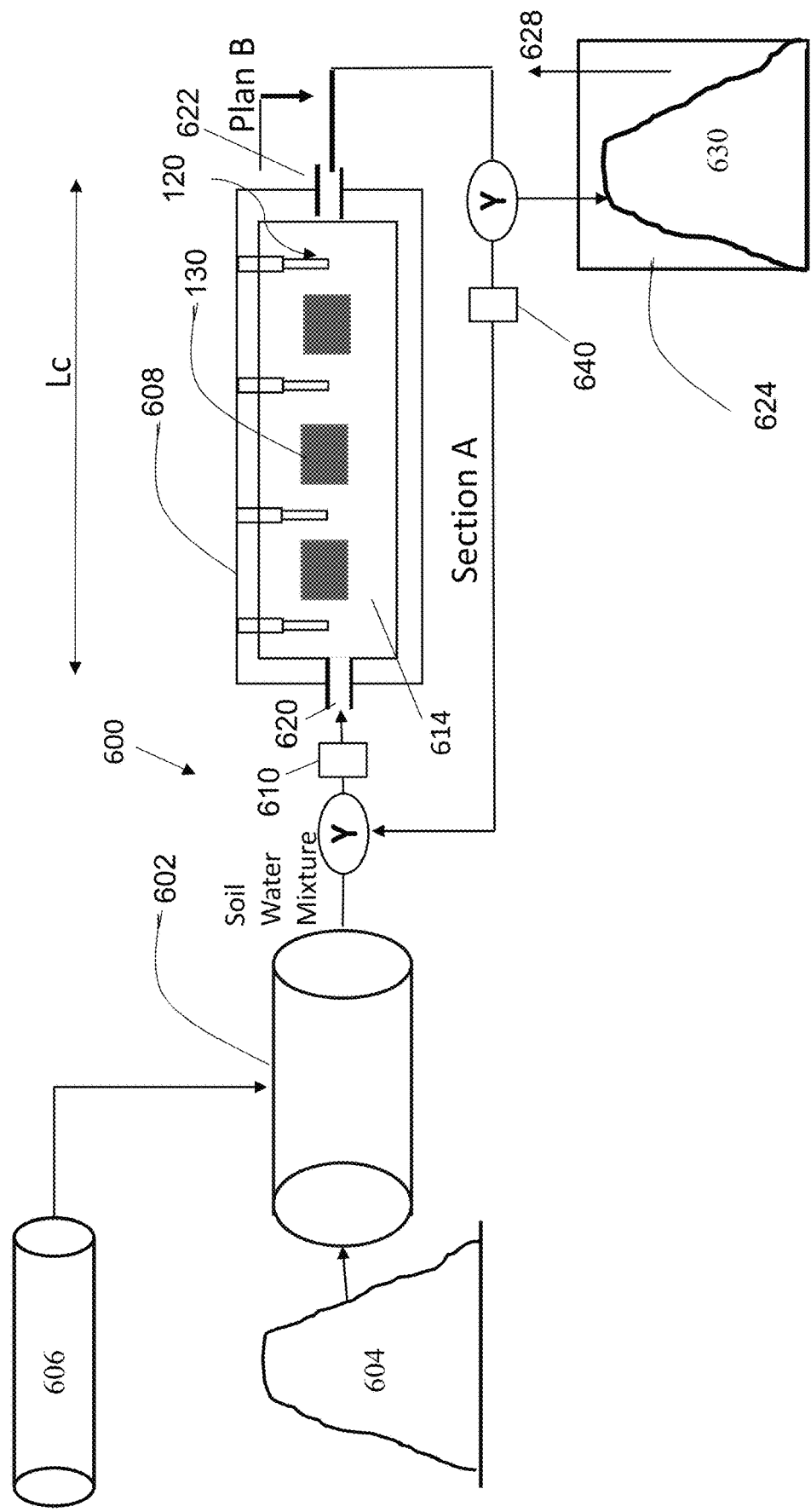
FIG. 6A depicts a schematic view of a system for remediation of contaminated soil in accordance with embodiments of the present disclosure.
Figure 6B:
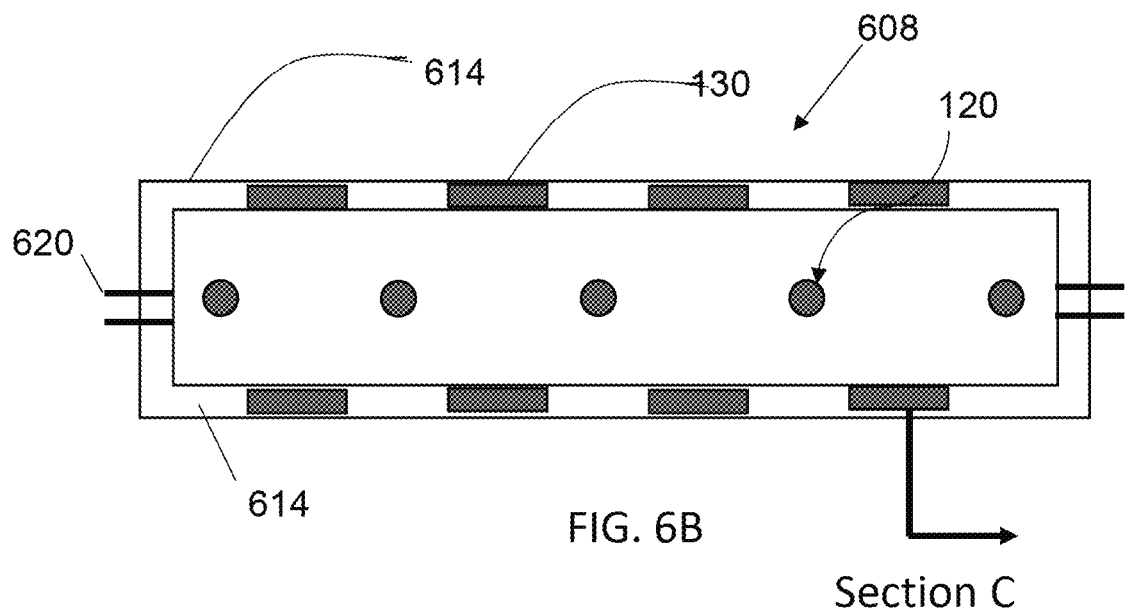
FIG. 6B depicts a top view of the system of FIG. 6A cut along the line defined as "Plan B".
Figure 6C:
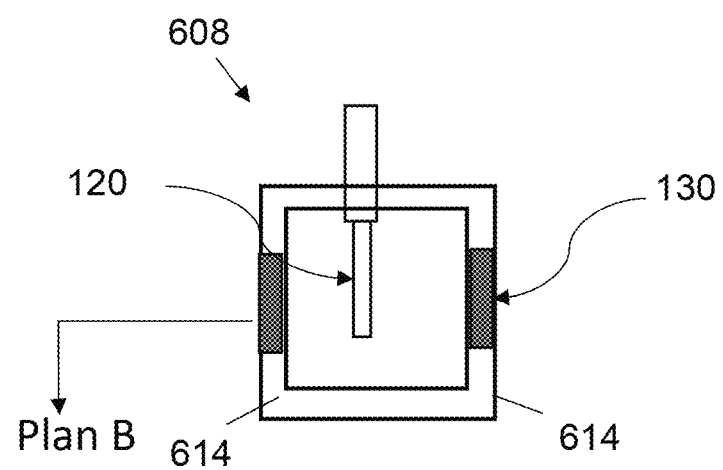
FIG. 6C depicts a side view of the system of FIG. 6B cut along the line defined as "Section C".

FIGS. 6A-C illustrate schematic views of a system 600 for remediation of contaminated soil. The system 600 can include a mixing unit 602 for mixing excavated contaminated soil 604 with water 606 to prepare soil water mixture (soil slurry) and a closed ultrasonic chamber 608. The ultrasonic chamber 608 can include a fluid inlet 620 at a first end and a fluid outlet 622 at a second end. The mixture (soil slurry) is pumped into the closed ultrasonic chamber 608 via the inlet 620 at the first end of the chamber 608. In some embodiments, the chamber 608 can be formed of stainless-steel. High-frequency submersible transducers in the form of the plate transducers 130 can be attached to side walls 614 of the chamber 608 along a length, Lc, of the chamber 608. Low-frequency ultrasound transducers in the form of the horn transducers 120 are placed in parallel with and between the side walls 614 of the chamber 608 such that a line of the horn transducers 120 extends along the length, Lc, of the chamber 608. The plate transducers 130 can be spaced at specified intervals in the chamber 608 of the system 600. In some embodiments, the horn transducers 120 and the plate transducers 130 can be offset from each other along the length, Lc, of the chamber 608. The transducers 120 and 130 can be energized by power amplifiers as described herein with reference to FIGS. 1A-C. In exemplary embodiments, the horn transducers 120 can operate at a first frequency and the plate transducers can operate at a second frequency. In exemplary embodiments, the first frequency can be on the order of tens of kilohertz (e.g., approximately 15 kHz to approximately 85 kHz). In exemplary embodiments, the first frequency can be approximately twenty kilohertz (20 kHz). In exemplary embodiments, the second frequency can be greater than the first frequency. As an example, the second frequency can be on the order of hundreds of kilohertz (e.g., approximately 100 kHz to approximately 1 MHz). In exemplary embodiments, the second frequency can be approximately two hundred kilohertz (200 kHz), three hundred thirty kilohertz (330 kHz), or four hundred fifty kilohertz (450 kHz). The ultrasonic waves emitted by the plate transducers 130 can propagate at angle of approximately ninety (90) degrees relative to ultrasonic waves emitted from the horn transducer 120. In some embodiments, any orientation of the horn transducers 120 and plate transducers 130 is possible. As another example, in some embodiments, one or more of the horn transducers 120 and one or more of the plate transducers 130 can face each other and emit ultrasonic energy towards each other (e.g., emit energy at 180 degree relative to each other). As another example, one or more of the horn transducers 120 and one or more of the plate transducers 130 can be parallel to each other to emit energy in the same direction (e.g., emit energy at an angle of zero degree relative to each other). In some embodiments, one or more of the horn transducers 120 and one or more of the plate transducers can be oriented to emit energy any angle relative to each other, varying from zero to 180 degrees.

In some embodiments, one of the plate transducers 130 can be operated at the same frequency or at multiple different frequencies. In some embodiments, one of the plate transducers 130 can operate at one frequency and a different one of the plate transducers can operate at a different frequency. For example, in some embodiments two plate transducers 130 can be oppposingly spaced and facing each other, and one of the two plate transducers 130 can vibrate at one frequency and the other of the two plate transducers 130 can vibrate at a different frequency.

In an exemplary operation, the mixture of contaminated soil and water (soil slurry) is pumped into the chamber 608 via the fluid inlet 620 at the first end of the chamber 608 by a pump 610. Once a specified or desired amount of the mixture has been pumped into the chamber, a low-frequency ultrasound energy can be applied via the horn transducers 120 to agitate the mixture and desorb contaminants from soil in the mixture, and a high-frequency ultrasound energy can be applied via the plate transducers 130 to initiate the sonochemical degradation via oxidation by free radicals and pyrolysis of the contaminates in the solid-liquid mixture that are detached and/or desorbed from solid particles.

In one embodiment, the horn transducers 120 and the plate transducers 130 vibrate simultaneously. In another embodiment, acoustic cavitation can be generated in two phases. In a first phase, the horn transducers 120 can be initially operated for a first period of time, such as two minutes, and then the plate transducers 130 can be operated for a second period of time, such as ten minutes. In another embodiment, the plate transducers 130 can run continuously with the horn transducers 120 generating pulse vibrations at a specified time interval, such as in system having plate transducers 130 running continuously while horn transducers 120 can provide a two minute burst every 10 minutes. The system 600 can employ sensors or other concentration detection device and control subsystems or components that might be required to process the mixture at a particular rate or at a particular scale.

After ultrasonic remediation of the soli-liquid mixture, the remediated mixture (soil slurry) is pumped out of the chamber 608 via the fluid outlet 622 at second end of the chamber by a pump 640. The remediated mixture can be collected in collection chamber 624. The remediated soil 630 can be allowed to settle in the collection chamber 608 and wastewater 628 above the settled soil 630 inside the collection chamber 624 can be extracted and remediated through a portable wastewater treatment facility on-site using filtration systems, such as, for example, nano-filtration/precipitation to capture heavy metals and other residual chemicals before recirculating cleaned water back into the chamber 608 for continued remediation of contaminate in soil. This process can ensure the capture of heavy metals and other residual chemicals prior to the release of water to the environment. If sufficient removal efficacy/treatment efficiency is not achieved, the remediated soil/mixture slurry can be recirculated through Y connection into the inlet of the treatment chamber for further treatment. In some embodiments, a solar array and backup batteries can be used to power the operation of the system 600.

In some embodiments, argon gas can be introduced into the chamber 608 of the system 600 to enhance the rate of sonolytic degradation. In some embodiments, the argon can be purged into the chamber 608 from the system 600 in the form of nano-bubbles to increase its dissolution in liquid. In some embodiments, catalysts or additives such as persulfate and sulfate ions can be added to the chamber 608 of the system 600 to enhance the reaction and cause complete mineralization.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure. The foregoing description of embodiments of the present disclosure has been presented for purposes of illustration and description. The described embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method for remediating contaminated solid particles, the method comprising:
receiving the contaminated solid particles and a cleaning liquid in an interior volume of a chamber through a fluid inlet formed in the chamber, wherein the chamber includes an ultrasonic rack positioned in the interior volume and wherein at least two baffle walls extend from the ultrasonic rack;
remediating the contaminated solid particles by (i) energizing a first type of ultrasonic device at a first frequency in the interior volume, the first type of ultrasonic device emitting ultrasonic energy at the first frequency to mix the liquid with the contaminated solid particles and to mechanically detach or ultrasonically desorb contaminates from the contaminated solid particles, wherein the first type of ultrasonic device is operatively coupled to the ultrasonic rack, and is positioned between but not coupled to the at least two baffle walls which extend from the ultrasonic rack; and (i) energizing a second type of ultrasonic device at a second frequency in the interior volume, the second frequency being greater than the first frequency, the second type of ultrasonic device emitting ultrasonic energy at the second frequency to initiate, via oxidation by free radicals and pyrolysis, sonochemical degradation of the contaminates that have been mechanically detached or ultrasonically desorbed from the contaminated solid particles, wherein the second type of ultrasonic device is only operatively coupled to the baffle walls; and
outputting wastewater generated by remediating the contaminated solid particles from the chamber through a fluid outlet formed in the chamber.

2. The method of claim 1, wherein the second type of ultrasonic device emits the ultrasonic energy at the second frequency at an angle of ninety degrees relative to the ultrasonic energy emitted at the first frequency by the first type of ultrasonic device.

3. The method of claim 1, further comprising:
energizing a pair of the second type of ultrasonic device, the pair being opposingly spaced and facing each other to emit ultrasonic energy towards each other.

4. The method of claim 1, further comprising:
energizing the first type of ultrasonic device for a first period of time; and
energizing the second type of ultrasonic device after the first type of ultrasonic device for a second period of time.

5. The method of claim 1, further comprising:
energizing the first type of ultrasonic device and the second type of ultrasonic device simultaneously.

6. The method of claim 1, further comprising:
energizing the second type of ultrasonic device continuously; and
energizing the first type of ultrasonic device intermittently at an interval of time.

7. The method of claim 1, wherein the first type of ultrasonic device is a horn transducer, and the second type of ultrasonic device is a plate transducer.

8. The method of claim 7, wherein the horn transducer operates at the first frequency between a range of fifteen to eighty kilohertz and the plate transducer operates at the second frequency greater than two hundred kilohertz.

9. The method of claim 7, further comprising:
energizing a first one of the second type of ultrasonic device at the second frequency; and
energizing a second one of the second type of ultrasonic device at a third frequency.

* * * * *